(12) United States Patent
Lacconi

(10) Patent No.: US 6,454,200 B1
(45) Date of Patent: Sep. 24, 2002

(54) SEAT BELT RETRACTOR

(75) Inventor: Sergio Lacconi, Turin (IT)

(73) Assignee: TRW Sabelt S.p.A., Moncalieri (IT)

( * ) Notice: Subject to any disclaimer, the term of this patent is extended or adjusted under 35 U.S.C. 154(b) by 0 days.

(21) Appl. No.: 09/526,392

(22) Filed: Mar. 16, 2000

(30) Foreign Application Priority Data

Mar. 16, 1999 (IT) .......................................... MI99A0531

(51) Int. Cl.⁷ .............................................. B65H 75/48
(52) U.S. Cl. ........................ 242/379; 280/806; 280/807
(58) Field of Search .......................... 242/379; 297/475, 297/478; 280/806, 807

(56) References Cited

U.S. PATENT DOCUMENTS 5,740,979 A * 4/1998 Rohrle ........................ 242/382
6,186,431 B1 * 2/2001 Biller et al. ................. 242/374

FOREIGN PATENT DOCUMENTS

DE 29805084 3/1998

* cited by examiner

*Primary Examiner*—John Q. Nguyen
(74) *Attorney, Agent, or Firm*—Tarolli, Sundheim, Covell, Tummino & Szabo L.L.P.

(57) ABSTRACT

A seat belt retractor has a frame (10), a spool (12) rotatably mounted in the frame and a blocking mechanism for selectively blocking rotation of the spool to prevent belt webbing from being withdrawn from the retractor. The frame has a threaded hole for a screw bolt permitting safe connection of the frame (10) to the vehicle bodywork. Mounting condition sensing devices are functionally inserted between the blocking mechanism and the screw bolt and effective to maintain the blocking mechanism in a blocking condition if and as long as an incomplete mounting condition is detected. The mounting condition sensing devices comprises a sleeve (22) adapted to be contacted by a front end of the bolt and to be pushed into a predetermined position by the bolt when a completed mounting condition is detected, therapy allowing release of the blocking mechanism.

13 Claims, 4 Drawing Sheets

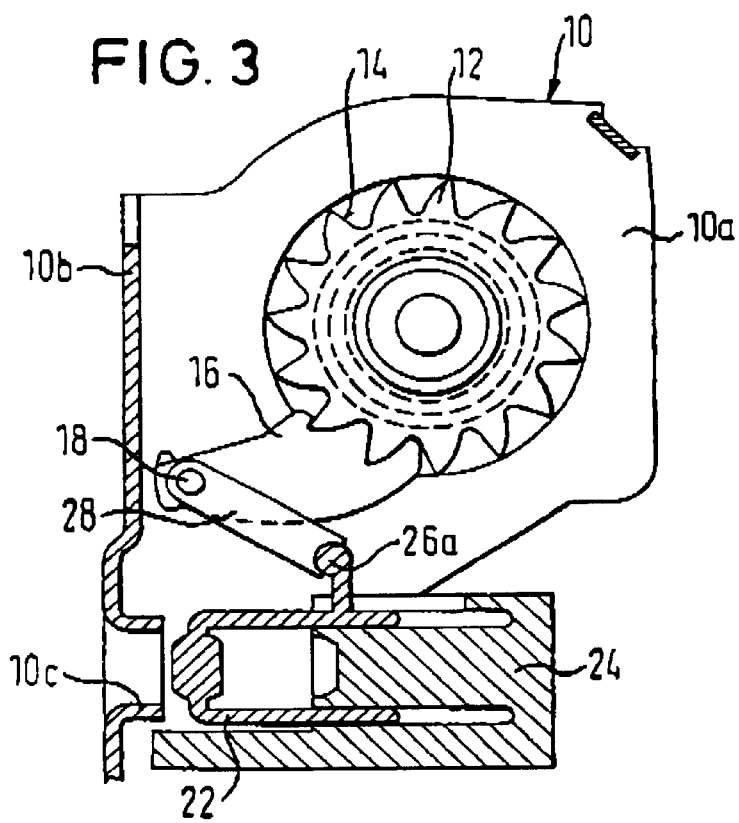
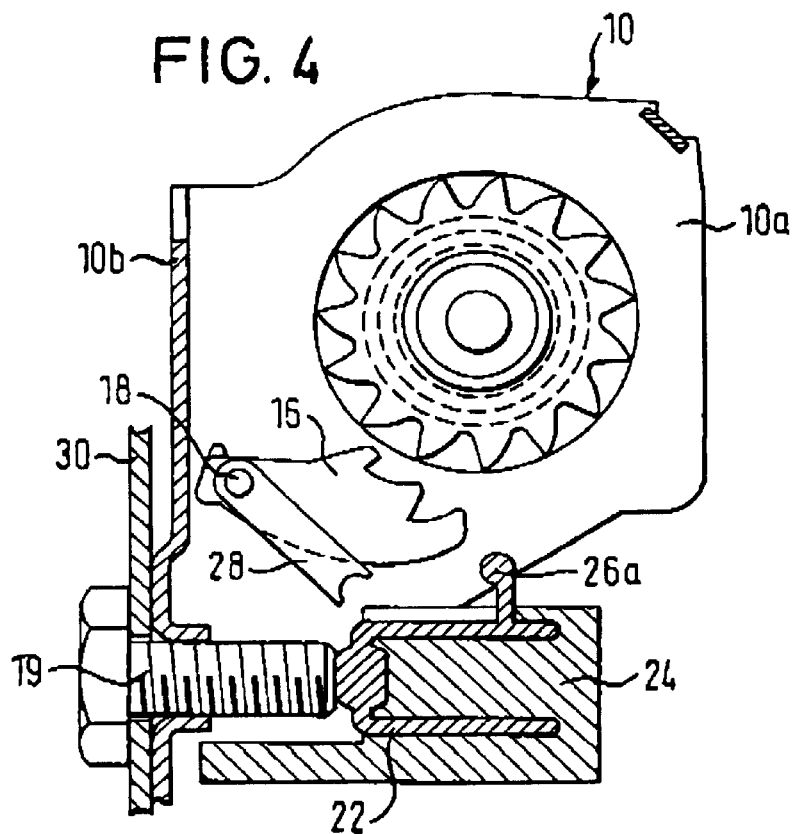

SEAT BELT RETRACTOR

The present invention relates to a seat belt retractor with a frame, a spool rotatably mounted in the frame and a blocking mechanism for selectively blocking rotation of the spool to prevent belt webbing from being withdrawn from the spool.

BACKGROUND OF THE INVENTION

Seat belt retractors for use in vehicles are mounted to some part of the vehicle bodywork at a location depending on the type of vehicle, the seat belt system used and the particular seat configuration. For reasons of optical appearance and protection, seat belt retractors are accommodated within some hollow space of the vehicle bodywork, and the belt webbing passes through an opening in an internal wall of the vehicle bodywork. For example, a seat belt retractor of a conventional three-point safety belt system associated with a front seat is typically accommodated within the B pillar of the vehicle, and the belt webbing is guided within the B pillar upwardly to and through a deflection ring.

Typically, a single screw bolt is used to attach the retractor frame to the vehicle bodywork. When the belt webbing is heavily tensioned such as in a vehicle crash, the tension load acting on the spool is transmitted to the retractor frame and then to the vehicle bodywork by means of the screw bolt. It is thus clear that the screw bolt has a critical function in assuring that the forces acting on the retractor frame are transmitted to and supported by the vehicle bodywork.

When the belt retractor is mounted at a hidden location within the vehicle, a visual verification of its mounting condition is usually impossible.

BRIEF SUMMARY OF THE INVENTION

To ensure that an incomplete mounting condition where the screw bolt is not or not completely screwed in can be reliably determined, the present invention provides a seat belt retractor with a belt spool that remains b locked until the mounting procedure whereby the retractor frame is attached to the vehicle bodywork, is completed. It is thus easy to check the mounting condition by simply pulling on the belt webbing. No belt webbing can be withdrawn from the retractor as long as the mounting procedure is not completed.

Specifically, the present invention provides a seat belt retractor having a frame, a spool rotatably mounted in the frame, a blocking mechanism for selectively blocking rotation of the spool to prevent belt webbing from being withdrawn from the spool, and mounting means for mounting the retractor to a vehicle body part. In accordance with the invention, mounting condition sensing means are functionally inserted between the blocking mechanism and mounting means and effective to maintain the blocking mechanism in a blocking condition if and as long as an incomplete mounting condition is detected. In the preferred embodiment where the mounting means includes a bolt for attachment of the retractor frame to the vehicle body part, the mounting condition sensing means is acted on by the bolt. Thus, the inventive belt reactor can be attached in the vehicle by a conventional mounting procedure using a screw bolt. In the preferred embodiment, the mounting condition sensing means comprises a sensing member such as a slider adapted to be contacted by a front end of the bolt and to be pushed into a predetermined position by the bolt when a completed mounting condition is detected. A similar slider has been in use on belt retractors with a pyrotechnic pretensioner drive with mechanical activator as a component of a safe transport system for disabling the activator during shipment and handling. In the latter case, the invention also permits to verify easily that the pretensioner drive is enabled after the mounting procedure is completed.

Further features of the invention will become apparent from the following description with reference to the drawings. In the drawings,

BRIEF DESCRIPTION OF THE DRAWINGS

FIGS. 3 and 4 show analogous views of a second embodiment of the belt retractor;

DETAILED DESCRIPTION OF THE PREFERRED EMBODIMENTS

Figure 1:
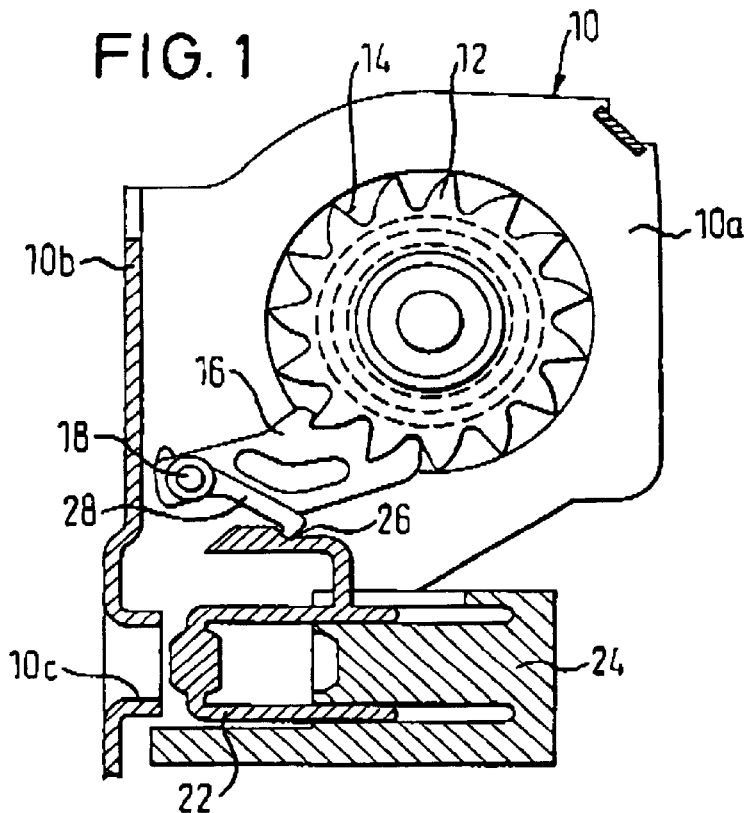
FIG. 1 is a schematic sectional view of the inventive belt retractor prior to the mounting procedure.
Figure 2:
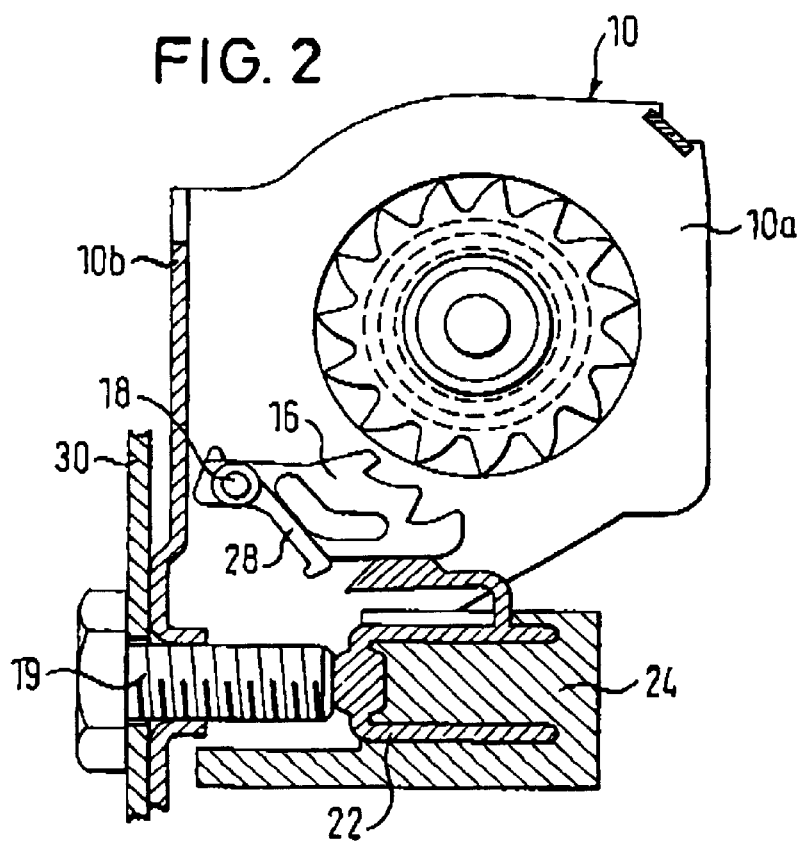
FIG. 2 shows the retractor of FIG. 1 in a completed mounting condition.

In each of the four embodiments disclosed, the basic construction of the belt retractor is the same and will thus be further explained only with reference to the embodiment shown in FIGS. 1 and 2.

The belt retractor has a generally U-shaped frame 10 with a pair of parallel side wings 10*a* interconnected by a base plate 10*b*. A spool 12 is rotatably mounted in the frame 10. The spool 12 has a ratchet toothing 14 at each of its axial end faces. Two parallel blocking pawls 16 are interconnected by a shaft 18 and are pivotally mounted in the frame 10 by means of shaft 18. The blocking pawls 16 have teeth corresponding to the ratchet toothing 14 of spool 12. By pivoting about shaft 18, the blocking pawls 16 can be moved into and out of engagement with the ratchet toothing 14 of spool 12. The ratchet toothing 14 and the blocking pawls 16 are the load bearing components of a blocking mechanism which further includes a conventional intertial sensor for controlling movement of blocking pawls 16.

The base plate 10*b* of frame 10 has a threaded through-opening 10*c* for accommodating of a screw bolt 19 (FIG. 2). A hollow slider 22 has a first, closed axial end opposite opening 10*c* and a second, open axial end slidingly accommodated in a socket 24 attached to frame 10. The socket 24 can be part of a mechanical activator of a pretensioner drive. The slider 22 has a projecting actuating lug 26 at the top, which is integrally formed with slider 22. An actuating arm 28 is attached to shaft 18 centrally between the two blocking pawls 16. In the condition shown in FIG. 1, the actuating arm 28 has its free end bearing on actuating lug 26, whereby the blocking pawls 16 are maintained in a position where the teeth of the blocking pawls engage the ratchet toothing 14 of spool 12. In this condition, the spool 12 is blocked, and no belt webbing can be withdrawn from the belt retractor. Simultaneously, in this condition, a safe transport system is active to disable operation of a pyrotechnic pretensioner drive with mechanical sensor (not shown), allowing safe shipment and handling of the retractor.

Thus, the position shown in FIG. 1 corresponds to the shipping and handling condition of the belt retractor. In this condition, the belt retractor is ready for the mounting procedure.

In the completed mounting condition shown in FIG. 2, screw bolt 19 is screwed into the threaded hole 10*c* of base plate 10b, and the frame 10 is thereby connected to a mounting wall 30 within the vehicle bodywork, for example within the B pillar of the vehicle. In this condition, the screw bolt 19 has pushed the slider 22 further into socket 24 of the mechanical activator housing so that the actuating lug 26 is disengaged from actuating arm 28, and the blocking pawls 16 are moved out of engagement with the ratchet toothing 14 of spool 12.

It is thus seen that slider 22 acts as a mounting condition sensing means which is functionally inserted between the blocking mechanism of the retractor and the screw bolt 19 to maintain the blocking mechanism in its blocking condition if and as long as the screw bolt 19 is not completely screwed into the threaded opening 10c. Since the slider 22 is part of the safe transport system, the pretensioner activator of the retractor is enabled in this and only in this condition, as easily verified by pulling on the belt webbing. This also permits to ensure that the screw bolt 19 has the correct length and is completely screwed in.

In the embodiment of FIGS. 1 and 2, the actuating lug 26 has a first section perpendicularly connected to the envelope of slider 22 and a second, angled section parallel to the envelope of slider 22. The free end of the second section of actuating lug 26 is provided with a boss, and the free end of actuating arm 28 engages behind the boss to ensure that the blocking pawls 16 assume a stable blocking position. The actuating lug 26 is flexible and yields when the slider 22 is pushed into socket 24 when the screw bolt 19 is screwed in. Preferably, the slider 22 and actuating lug 26 are integrally molded of an appropriate plastic material.

In the embodiment of FIGS. 3 and 4, the slider 22 is likewise provided with an actuating lug 26a. In this case, actuating lug 26a consists of a single straight section perpendicular to the envelope of slider 22 with a ball-shaped thickened end. Actuating arm 28 has its free end shaped with a recess corresponding to the ball-shaped free end of actuating lug 26a. In the condition prior to mounting, as shown in FIG. 3, the ball-shaped end of actuating lug 26a engages into the recess at the free end of actuating arm 28, thereby ensuring a stable blocking position of blocking pawls 16.

Figure 5:
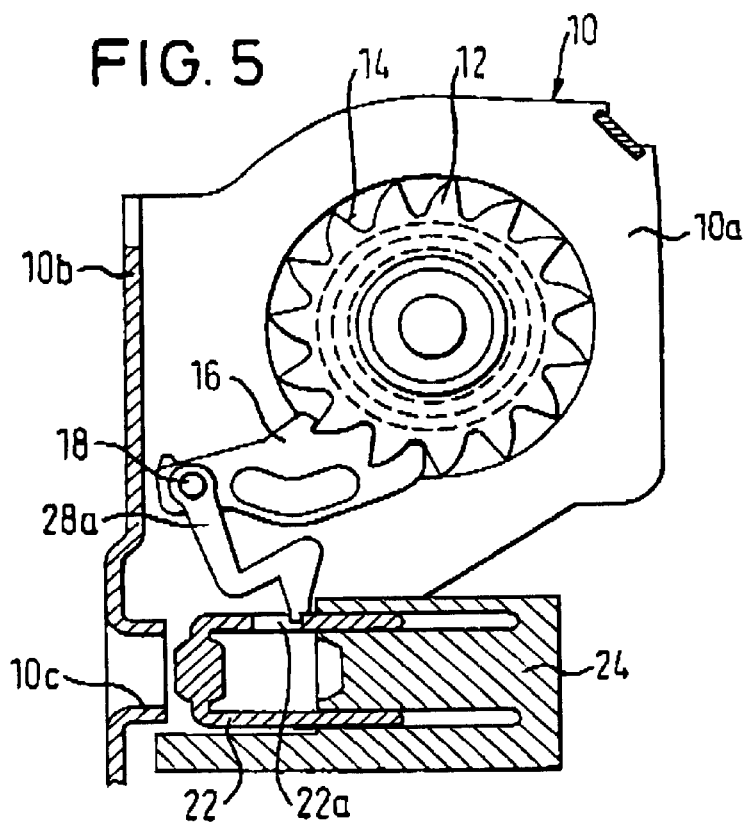
FIGS. 5 and 6 show analogous views of a third embodiment.
Figure 6:
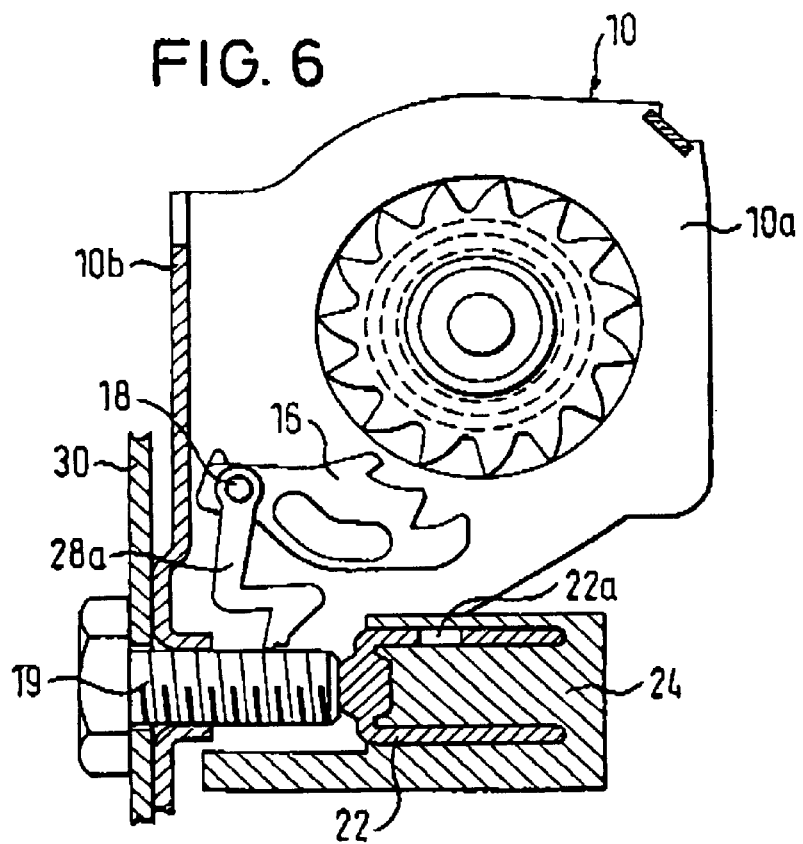

In the embodiment shown in FIGS. 5 and 6, actuating arm 28a has a first, straight section perpendicular to shaft 18 and an angled end section shaped as a hook. Sleeve 22 is provided with a recess in its envelope, and the hook-shaped end of actuating arm 28a engages into this recess in the condition prior to mounting, as shown in FIG. 5. Engagement of the hook-shaped end of locking arm 28a ensures a stable blocking position of the blocking pawls 16. When the screw bolt 19 is screwed in, as shown in FIG. 6, the hook-shaped end of actuating arm 28a is forced out of engagement with the recess 22a of slider 22. To permit disengagement of actuating arm 28a with the recess 22a in slider 22, the actuating arm 28a is flexible.

Figure 7:
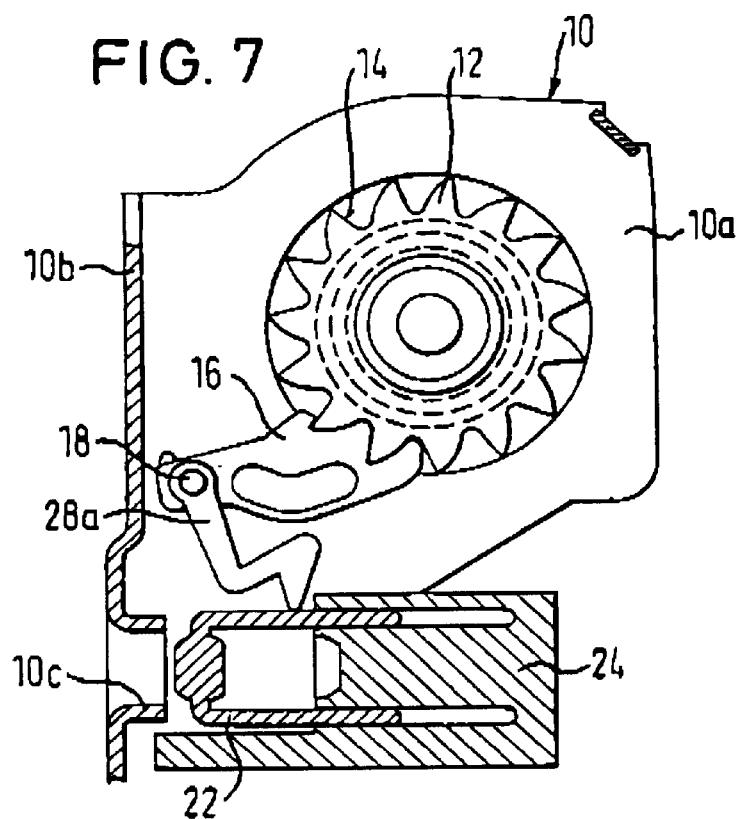
FIGS. 7 and 8 show analogous views of a fourth embodiment.
Figure 8:
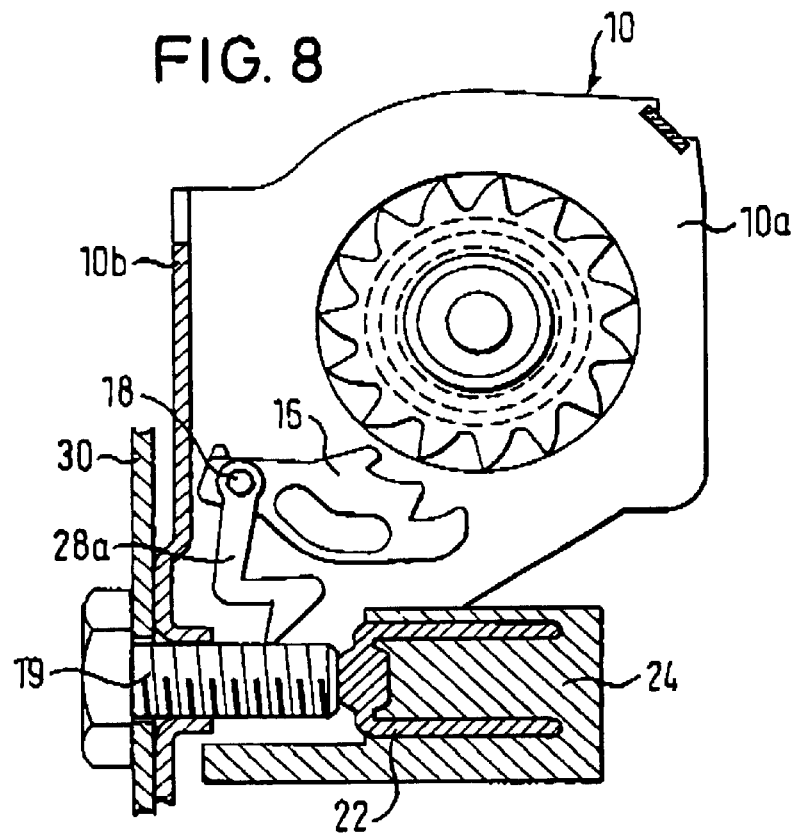

In the embodiment shown in FIGS. 7 and 8, a similar actuating arm 28a is used, but slider 22a is not provided with a recess. Rather, as shown in FIG. 7, the free end of actuating arm 28a bears on the outer surface of slider 22. As long as slider 22 is not completely or almost completely pushed into socket 24, the free end of actuating arm 28a remains supported by the envelope of slider 22, ensuring a stable blocking position of blocking pawls 16.

Although a particular type of seat belt retractor is disclosed, it should be understood that the invention is applicable to any type of retractor, with or without a pretensioner.

What is claimed is:

1. A seat belt retractor having a frame, a spool rotatably mounted in said frame, a blocking mechanism for selectively blocking rotation of said spool to prevent belt webbing from being withdrawn from said spool, said blocking mechanism comprising an actuating arm, and seat belt retractor further having mounting means for mounting said retractor to a vehicle body part, and mounting condition sensing means functionally inserted between said blocking mechanism and said mounting means and effective to maintain said blocking mechanism in a blocking condition if and as long as an incomplete mounting condition is detected, said mounting condition sensing means having an actuating lug, said actuating lug having a boss, said actuating arm of said blocking mechanism engaging behind said boss in an incomplete mounting condition, said boss structured to be moved to behind the actuating arm in an unblocked condition.

2. The seat belt retractor of claim 1, wherein said mounting means include a bolt for attachment of said frame on said vehicle body part, and said mounting condition sensing means is acted on by said bolt.

3. The seat belt retractor of claim 2, wherein said mounting condition sensing means comprises a sensing member adapted to be contacted by a front end of said bolt and to be pushed into a predetermined position by said bolt when a completed mounting condition is detected.

4. The seat belt retractor of claim 3, wherein said sensing member has an actuating lug which, in an incomplete mounting condition, engages a blocking pawl of said blocking mechanism and, in a completed mounting condition, is disengaged from said blocking pawl.

5. The seat belt retractor of claim 4, wherein said actuating lug and said actuating arm have complementary shaped configurations ensuring a stable condition of interengagement.

6. The seat belt retractor of claim 4, wherein said actuating arm is flexible.

7. The seat belt retractor of claim 4, wherein said actuating lug is flexible.

8. The seat belt retractor of claim 3, wherein said actuating arm engages into a recess in said sensing member.

9. The seat belt retractor of claim 3, wherein said sensing member is a slider with a first, closed axial end facing said screw bolt and a second axial end slidingly accommodated in a mechanical activator housing fixed to the retractor frame.

10. The seat belt retractor of claim 9, wherein said actuating arm engages on the outer surface of said slider.

11. The seat belt retractor of claim 3, wherein said sensing member is a component in a safety transport system which disables a pretensioner drive with mechanical activator as long as an incomplete mounting condition is detected.

12. A seat belt retractor comprising:

a frame;

a spool rotatably mounted in said frame;

a blocking mechanism for selectively blocking rotation of said spool to prevent belt webbing from being withdrawn from said spool, said blocking mechanism comprising an actuating arm;

mounting means for mounting said retractor to a vehicle body part; and mounting condition sensing means located between said blocking mechanism and said mounting means and movable from a first condition in which said blocking mechanism blocks rotation of said spool when an incomplete mounting condition is detected to a second condition in which said blocking mechanism does not block rotation of said spool when a completed mounting condition is detected, said mounting condition sensing means including a slider having an actuating lug engaging said actuating arm when in said first condition, said slider being movable relative to said block mechanism, said mounting means comprising a threaded fastener, said threaded fastener moving and slider during mounting of said retractor to said vehicle part and moving said actuating lug out of engagement with said actuating arm to cause said blocking mechanism to not block rotation of said spool.

13. A seat belt retractor comprising:

a frame;

a spool rotatably mounted in said frame;

a blocking mechanism having a blocking condition in which said blocking mechanism blocks rotation of said spool to prevent belt webbing from being withdrawn from said spool and an unblocking condition in which said blocking mechanism does not block rotation of said spool, said blocking mechanism comprising an actuating arm;

mounting means for mounting said retractor to a vehicle body part; and mounting condition sensing means located between said blocking mechanism and said mounting means and movable from a first condition in which said blocking mechanism blocks rotation of said spool when an incomplete mounting condition is detected to a second condition in which said blocking mechanism does not block rotation of said spool when a completed mounting condition is detected, said mounting condition sensing means having a movable actuating lug, said actuating lug having a boss, said actuating arm of said blocking mechanism engaging behind said boss in an incomplete mounting condition and said actuating arm of said blocking mechanism being located in front of said boss in said completed mounting condition after movement of said mounting condition sensing means from said first condition to said second condition and to cause said blocking mechanism to operate from said blocking condition to said unblocking condition.

* * * * *